United States Patent
Kottiyath et al.

(10) Patent No.: US 11,286,317 B2
(45) Date of Patent: Mar. 29, 2022

(54) MORPHOLOGY MODIFIED HETEROPHASE PROPYLENE COPOLYMERS AND THEIR PRODUCTS THEREOF

(71) Applicant: Indian Oil Corporation Limited, Mumbai (IN)

(72) Inventors: Vimal Kakkarakkal Kottiyath, Haryana (IN); Saranya Sethuramalingam, Haryana (IN); Naresh Shiva, Haryana (IN); Jatinder Dhaliwal Singh, Haryana (IN); Vishal Goel, Haryana (IN); Ptabhu Narain Chakrawal, Haryana (IN); Abhilasha Mishra, Haryana (IN); Shashikant, Haryana (IN); Gurpreet Singh Kapur, Haryana (IN); Sankara Sri Venkata Ramakumar, Haryana (IN)

(73) Assignee: Indian Oil Corporation Limited, Mumbai (IN)

(*) Notice: Subject to any disclaimer, the term of this patent is extended or adjusted under 35 U.S.C. 154(b) by 64 days.

(21) Appl. No.: 16/802,012

(22) Filed: Feb. 26, 2020

(65) Prior Publication Data
US 2020/0325256 A1    Oct. 15, 2020

(30) Foreign Application Priority Data
Apr. 12, 2019   (IN) .............................. 201921014794

(51) Int. Cl.
| C08L 23/26 | (2006.01) |
| C08L 23/16 | (2006.01) |
| C08F 8/00 | (2006.01) |
| C08F 110/06 | (2006.01) |
| B29C 48/40 | (2019.01) |
| C08F 2/06 | (2006.01) |
| C08F 210/02 | (2006.01) |
| C08F 210/06 | (2006.01) |
| C08F 210/16 | (2006.01) |
| B29K 23/00 | (2006.01) |
| C08K 5/11 | (2006.01) |
| C08K 5/14 | (2006.01) |

(52) U.S. Cl.
CPC ............ C08F 110/06 (2013.01); B29C 48/40 (2019.02); C08F 2/06 (2013.01); C08F 210/02 (2013.01); C08F 210/06 (2013.01); C08F 210/16 (2013.01); C08L 23/26 (2013.01); B29K 2023/08 (2013.01); B29K 2023/14 (2013.01); C08K 5/11 (2013.01); C08K 5/14 (2013.01); C08L 23/16 (2013.01); C08L 2207/02 (2013.01)

(58) Field of Classification Search
CPC .......... C08L 23/12; C08L 23/16; C08L 23/26; C08F 110/06; C08F 210/16
See application file for complete search history.

(56) References Cited

U.S. PATENT DOCUMENTS

| 4,578,431 | A | * | 3/1986 | Shaw | ................. C08F 8/00 525/387 |
| 7,649,046 | B2 | * | 1/2010 | Pham | ................. C08L 23/10 524/515 |
| 7,659,349 | B2 | * | 2/2010 | Roegiers | ............. B29C 48/022 524/401 |
| 7,902,300 | B2 | * | 3/2011 | VanDeurzen | ............ C08J 11/22 525/387 |
| 8,338,343 | B2 | * | 12/2012 | Meessen | ............. C10M 133/56 508/459 |
| 8,921,466 | B2 | * | 12/2014 | Satpathy | ................ C08K 5/005 524/153 |
| 9,074,062 | B2 | * | 7/2015 | Satpathy | ................ C08K 5/04 |
| 9,169,336 | B2 | * | 10/2015 | Dagley | ................ C08F 10/06 |
| 9,410,035 | B2 | * | 8/2016 | Peterson | ............... C08L 23/10 |
| 9,527,989 | B2 | * | 12/2016 | Herklots | ................ C08L 23/10 |
| 9,879,134 | B2 | * | 1/2018 | Peterson | ................ C08K 5/14 |
| 9,976,019 | B2 | * | 5/2018 | Matsunaga | .......... C08L 23/142 |
| 10,081,720 | B2 | * | 9/2018 | Chikhalikar | ........... C08K 5/105 |
| 10,100,187 | B2 | * | 10/2018 | Peterson | ................ C08L 23/16 |
| 10,590,270 | B2 | * | 3/2020 | Trenor | ................... C08L 23/36 |
| 11,117,995 | B2 | * | 9/2021 | Feng | .................. C08K 5/5419 |
| 2007/0004864 | A1 | * | 1/2007 | Beatty | ................ C08L 51/06 525/240 |
| 2008/0287597 | A1 | * | 11/2008 | Pham | ................. C08L 23/10 524/528 |
| 2011/0118400 | A1 | * | 5/2011 | Neuteboom | ............. C08F 8/50 524/400 |
| 2012/0065333 | A1 | * | 3/2012 | Li | ....................... C08F 255/02 525/106 |
| 2013/0059958 | A1 | | 3/2013 | Satpathy et al. | |
| 2017/0349735 | A1 | * | 12/2017 | Remerie | ............ C08K 5/0025 |
| 2020/0095360 | A1 | * | 3/2020 | Wang | ................. C08F 255/02 |
| 2020/0123361 | A1 | * | 4/2020 | Lummerstorfer | ....... C08L 23/12 |

FOREIGN PATENT DOCUMENTS

| WO | WO-2010/009825 A1 | 1/2010 |
| WO | WO-2012/049690 | 4/2012 |

(Continued)

*Primary Examiner* — Rip A Lee

(74) *Attorney, Agent, or Firm* — Blank Rome LLP

(57) ABSTRACT

The present invention provides a morphology modified heterophase polymer having No-Break impact strength in the range of 500 J/m-700 J/m as per ASTM standard D256, a high melt flow index in the range of 100 g/10 min as per ASTM D1238, and a balanced flexural modulus as per ASTM standard D790. More particularly, the present invention relates to a process for the modification of morphology of heterophase propylene polymer in the presence of an initiator in the form of organic peroxide and a multifunctional unsaturated organic vinyl compound on the ex-reactor Heterophase Propylene Copolymer powder and/or pellet using special extrusion device.

11 Claims, No Drawings

(56) References Cited

FOREIGN PATENT DOCUMENTS

| WO | WO-2015/138300 A1 | 9/2015 |
| WO | WO-2016/014122 A1 | 1/2016 |

* cited by examiner

MORPHOLOGY MODIFIED HETEROPHASE PROPYLENE COPOLYMERS AND THEIR PRODUCTS THEREOF

RELATED APPLICATION

This application claims the benefit of Indian Application No. 201921014794, filed on Apr. 12, 2019. The entire disclosure of this application is hereby incorporated by reference.

FIELD OF THE INVENTION

The present invention relates to a morphology modified heterophase polymer. More particularly, the present invention relates to a process for modifying morphology of heterophase propylene polymer in the presence of an initiator and a multi functional compound/additive on the ex-reactor polypropylene copolymer. More specifically, the process also describes to obtain morphology modified heterophase polymer/heterophase propylene copolymers having higher melt flow index with no-break impact strength defined by notched izod at room temperature.

BACKGROUND OF THE INVENTION

One recent trend in the product development is polypropylene (PP) systems containing more than two dispersed phases. The design concept of such blends is to choose the minor components in such a way that the advantages of the one to compensate the deficiencies of the other. Bimodality of the dispersed phase size could be a promising approach for ensuring toughness over a wide temperature range as the optimum particle size for toughening of polypropylene decreases with increasing temperature because of dependence of deformation mechanism on temperature.

Product development started simply with melt blending PP homopolymers with different amounts of externally produced elastomers like ethylene-propylene (EPR) or ethylene-propylene-diene elastomers (EPDM) to overcome the critical glass transition temperature (Tg) of PP at ~0° C., which slowly developed into a science and technology of its own. The use of advanced catalysts (Ziegler-Natta (ZN), metallocenes, constrained geometry catalysts etc) with controlled particle morphology in multi-stage polymerization processes has allowed the production of heterophasic (impact) propylene copolymers. Applications of these multiphase PP copolymers with the crystalline PP matrix and disperse amorphous EP-elastomer phase were no longer limited to the technical or automotive area, but include pipe materials and a wide range of advanced packaging solutions. "Block copolymers" came from multi-reactor gas phase plants, such as bulk/gas phase combinations like the Spheripol or the Borstar PP process. Such grades combine a crystalline PP matrix (produced in the first 1-2 reactors) with embedded particles of EPR and PE (produced in 1 or more following reactors) defining impact and low-temperature resistance which were then came to be called as heterophasic copolymers or impact copolymers. In reactor impact copolymer, addition to the crystalline PP matrix and the amorphous EPR, further crystalline copolymers having both PP and PE crystallizable segments, and even medium-density PE copolymerized with C3 can be found. The elucidation of this complex structure has been progressing by combining cross-fractionation with various techniques correlating the molecular structure to the performance of these materials. This strongly influences the phase behaviour and interfacial adhesion between the matrix and the dispersed phase.

Size, shape, internal structure and spatial packing of the dispersed domains are critical parameters affecting not only the mechanical performance but also properties like surface appearance, transparency and migration. This "phase morphology" is a complex result of the component's rheology, the compatibility between matrix and dispersed phase, and the processing conditions. Variation of the EPR composition has been shown to affect all three.

Simply increasing the EPR weight fraction in PP impact copolymers is general approach to improve toughness by reducing the inter-particle distance and increasing the energy absorption capacity. Indeed, a step-wise brittle-to-tough transition is observed as a function of EPR concentration.

Post reactor modifications: Historically, PP is blended with various impact modifiers like EPR, EPDM or polystyrene-block-poly(ethylene-co-but-1-ene)-block-polystyrene (SEBS) to improve the impact behavior or generally balance the property profile of these materials. The development of new processes and catalysts allowed an in-situ preparation of these materials and the resulting systems are quite complex in structure requiring advanced analyses to establish structure-property relationships.

The higher the compatibility of the components results in higher impact strength at room temperature.

A further possibility is the chemical modification and/or degradation of a reactor grade in radical reactions e.g. initiated by peroxides. Depending on the temperature during the radical reaction and the presence of co-agents, grafted, branched or degraded (visbroken) PP can be obtained. Peroxide-induced degradation or visbreaking is often used to increase the flow properties of PP.

A combination of radical modification and recombination in the presence of a coupling agent will lead to high melt strength PP with long-chain branching if a PP homopolymer is used as base-material. The same process results in reactive-modified copolymers if an impact copolymer is the base material. The addition of a free radical initiator and a co-agent like a diene causes the formation of ethylene-propylene grafted to PP which will strengthen the interface between the PP-matrix and the EPR-particles and reduce the tendency of the particles to agglomerate. These materials show refined morphology and strongly increased impact strength.

WO 2012049690A1 describes the process for preparing high melt strength propylene polymers comprises blending base propylene polymers with 0.1 to 1% w/w of polyfunctional acrylate monomer, in the presence of 10 to 50 ppm organic peroxide and 0.2 to 20% w/w of an additive such as stabilizer, acid neutralizer, antioxidants or lubricants.

US20130059958A1 covers the process of modifying propylene polymers via melt grafting of polyfunctional monomer (PFMs) involving pre-initiative step thereby facilitating perfect absorption of PFMs on polymer matrix and initiate their grafting prior to reactive extrusion without using free radical initiators so that branching can be introduced in propylene polymer matrix.

US20070004864A1 covers the polypropylene composition and a method to prepare the composition. The method includes the mixing and extrusion of an isotactic polypropylene, at least one impact modifying polymer, at least one primary co-agent that is a mono-functional monomer, at least one secondary co-agent which is a multifunctional monomer, oligomer, or polymer, and a radical initiator. The composition may be prepared in an extruder.

WO2016014122A1 relates to heterophasic polymer composition comprising: (a) a propylene polymer phase comprising propylene polymers selected from the group consisting of polypropylene homo-polymers and copolymers of propylene and up to 50 wt % of one or more co-monomers.

WO2015138300A1 relates to heterophasic polymer composition comprising: (a) a propylene polymer phase comprising propylene polymers selected from the group consisting of polypropylene homo-polymers and copolymers of propylene and up to 50 wt % of ethylene and/or C4-10 α-olefin monomers.

WO 2010009825A1 covers the process for producing a modified polypropylene composition comprises adding at least one org. peroxide, a polyfunctional acrylate as coagent at a peroxide/coagent ratio from 1:0.4 to 1:5, and an acid scavenger.

In view of above discussion it is clear that with hetrophasic impact copolymer, the challenge is to maintain right balance of impact strength and flexural modulus along with a higher Melt flow index more than 100 dg/min. So the problem of attaining a PP composition of having highest impact resistance of no-break along with higher Melt flow without affecting the flexural modulus is solved in the present invention.

SUMMARY OF THE INVENTION

An object of the present invention is to provide a morphology modified heterophase polymer and a novel and economical process for morphology modification of heterophase polypropylene copolymer using a multi-function additive and organic peroxide. It is the further object of the present invention is to provide the morphology modification of heterophase copolymer of polypropylene which involves a novel and economical process of preparation of morphology modifier composition and post reactor extrusion process. It is an another object of the present invention is to provide the morphology modified products which are useful for injection molding, thin wall injection molding, compounding applications etc.

Accordingly, the present invention provides a morphology modified heterophase polymer having two different phase comprising:
   first phase being propylene phase polymer comprising homo polypropylene and copolymer of propylene and ethylene, and optionally C4-C10 alpha olefin, wherein propylene content in the propylene phase polymer is 90-95% by weight; and
   second phase being ethylene phase polymer comprising homo polyethylene and copolymers of ethylene and C3-C10 alpha olefin, wherein ethylene content in the ethylene phase polymer is in the range of 20 to 50% by weight;
   wherein the morphology modified heterophase polymer is having a No-Break impact strength in the range of 500 J/m-700 J/m as per ASTM standard D256, a high melt flow index in the range of 3-150 g/10 min as per ASTM D1238, and a balanced flexural modulus in the range of 700-1400 MPa as per ASTM standard D790.

In one feature of the present invention, the morphology modified heterophase polymer is having the No-Break impact strength and defined by notched izod at room temperature measured. In another feature of the present invention, the morphology modified heterophase polymer is having the balanced flexural modulus up to 1800 MPa.

In another feature of the present invention, the ethylene content in the morphology modified heterophase polymer is in the range of 5 to 75% by weight and preferably in the range of 8-20% by weight.

In another feature of the present invention, the propylene content in the morphology modified heterophase polymer is in the range of 90-95% by weight.

In one feature of the present invention, the C4-C10 alpha olefin is selected from the group comprising of 1-butene, 1-hexene, 1-pentene, 1-octene, and 1-decene.

In another feature of the present invention, the C3-C10 alpha olefin is selected from the group comprising of 1-propene, 1-butene, 1-hexene, 1-pentene, 1-octene, and 1-decene.

In still another feature of the present invention, the ethylene concentration in the propylene phase polymer is 5 to 50%.

In another feature of the present invention, in the morphology modified heterophase polymer, either ethylene or propylene phase constitute the continuous and discrete phase of the heterogeneous polymer system. The concentration of ethylene and propylene phase may vary widely dependant on the discrete or dispersion phase concentration.

In yet another embodiment, the ethylene polymer phase can be made of ethylene propylene copolymer or ethylene octane based elastomer.

The present invention also provides a process for preparing morphology modified heterophase polymer, wherein the process comprising:
(i) premixing a multifunctional additive and a peroxide in an organic solvent to obtain a morphology modifier composition and mixing the morphology modifier composition with a heterophase polymer to obtain a premixed composition; and
(ii) extruding the premixed composition to obtain the morphology modified heterophase polymer.

In one feature of the present invention, in the process for preparing morphology modified heterophase polymer, the premixed composition is extruded in a twin screw extruder (TSE) at a temperature 160-300° C.

In another feature of the present invention, in the process for preparing morphology modified heterophase polymer, the multifunctional additive is an unsaturated organic vinyl compound and selected from the group comprising of pentaerythritol triacrylate, pentaerythritol tetraacrylate, and butanediol diacrylate.

In yet another feature of the present invention, in the process for preparing morphology modified heterophase polymer, the multifunctional additive is added in an amount of 1000-7500 ppm.

In yet another feature of the present invention, in the process for preparing morphology modified heterophase polymer, the peroxide is selected from the group comprising of alkyl peroxide and peroxy ester.

In yet another feature of the present invention, in the process for preparing morphology modified heterophase polymer the peroxide is added in an amount of 25 to 2000 ppm.

In still another feature of the present invention, in the process for preparing morphology modified heterophase polymer, the organic solvent is selected from the group comprising of acetone, dichloromethane (DCM), paraffin oil, and ethanol.

In still another feature of the present invention, in the process for preparing morphology modified heterophase polymer, the organic solvent is added in an amount of 0.5 to 60 ml/kg.

In still another feature of the present invention, in the process for preparing morphology modified heterophase polymer, the premixing is carried out at a temperature in the range of 10 to 35° C. or should not exceed boiling point of the organic solvent or peroxide or multifunctional Additive.

In yet another feature of the present invention, in the process for preparing morphology modified heterophase polymer, the premixing is carried out for a time in the range of 2 minutes to 30 minutes.

In one feature of the present invention, in the process for preparing morphology modified heterophase polymer, the step (i) comprises adding an antioxidant, acid scavenger and nucleating agent additive package.

In one of the preferred feature of the present invention, in the process for preparing morphology modified heterophase polymer, the heterophase polymer having two different phases:
first phase being propylene phase polymer comprising homo polypropylene and copolymer of propylene and ethylene, and optionally C4-C10 alpha olefin, wherein propylene content in the propylene phase polymer is 90-95% by weight, and
second phase being ethylene phase polymer comprising homo polyethylene and co polymers of ethylene and C3-C10 alpha olefins, wherein ethylene content in the ethylene phase polymer is in the range of 20-50% by weight.

In yet another feature of the present invention, in the process for preparing morphology modified heterophase polymer, the heterophase polymer has two different phases:
(i) homo polypropylene and
(ii) copolymers of ethylene and propylene,
which is manufactured in a two stages process, where polymerization of homo-polypropylene takes place in a first reactor and in a second reactor ethylene propylene rubber polymerization takes place.

In yet another feature of the present invention, in the process for preparing morphology modified heterophase polymer, the polymerization is carried out in presence of a Ziegler Natta or metallocene catalyst.

In still another feature of the present invention, in the process for preparing morphology modified heterophase polymer, ethylene content of the ethylene propylene copolymer is in the range from 10-80 wt %.

In still another feature of the present invention, in the process for preparing morphology modified heterophase polymer, ethylene content in the heterophase polymer is in the range of 8-20%.

In another feature of the present invention, in the process for preparing morphology modified heterophase polymer, xylene content of the heterophase polymer is in range of 10-30 wt % as per ASTM D5492, melt flow index (MFI) is in the range of 10-100 g/10 min as per ASTM D1238 and the flexural modulus is in range of 700-1300 MPA and impact properties defined by notched izod at room temperature measured is in the range of 80-700 J/m as per ASTM standard D790 and D256 respectively.

In one of the feature of the present invention, the morphology modified heterophase polymer results in property enhancement of high flow and high impact.

In another feature of the present invention, in the process for preparing morphology modified heterophase polymer, the premixed composition is extruded in a twin screw extruder at a temperature 160-300° C. In one of the preferred feature the premixed composition is extruded in a twin screw extruder at a temperature in the range of 100-280° C.

In a preferred feature, in the process for preparing morphology modified heterophase polymer, the multifunctional additive is an unsaturated organic vinyl compound and selected from the group comprising of pentaerythritol triacrylate, pentaerythritol tetraacrylate, and butanediol diacrylate. In yet another feature, the multifunctional additive is added in an amount of 1000-7500 ppm.

In another preferred feature, in the process for preparing morphology modified heterophase polymer, the peroxide is selected from the group comprising of alkyl peroxide and peroxy ester. In one feature, the peroxides is selected from the group comprising of di-tert-butylperoxide, dicumyl peroxide, 1,3-bis(tert-butylperoxyisopropyl)benzene, tert-butylcumyl peroxide, 2,5-bis(tert-butylperoxy)-2, 5-dimethylhexyne-3, diisopropylbenzene monohydroperoxide, 2,5-bis (tert-butylperoxy)-2,5-dimethylhexane, tert butylperoxybenzoate and lauryl peroxide commercial name like Luprox 101, Luprox 100 Triganox 101, Triganox 301 etc. In yet another feature, the peroxide is added in an amount of 25-2000 ppm.

In another preferred feature, in the process for preparing morphology modified heterophase polymer, the organic solvent is selected from the group comprising of acetone, dichloromethane (DCM), paraffin oil, and ethanol. In yet another feature of the present invention, the organic solvent is added in an amount of 0.5 to 60 ml/kg.

In a preferred feature, in the process for preparing morphology modified heterophase polymer, the premixing is carried out at a temperature in the range of 10 to 35° C. or should not exceed boiling point of the organic solvent or peroxide or multifunctional Additive. In another preferred feature, the premixing is carried out for a time in the range of 2 to 30 minutes. Preferably, the premixing is carried out for a time in the range of 2-20 minutes. More preferably, the premixing is carried out for a time in the range of 5-10 minutes. In yet another feature, the premixing is carried out at ambient pressure, either in presence of inert gas or in presence of air.

In another preferred feature, in the process for preparing morphology modified heterophase polymer, the step (i) comprises adding an antioxidant (primary, secondary), acid scavenger and nucleating agent additive package. In another feature, the antioxidant is primary and secondary.

In a one feature, in the process for preparing morphology modified heterophase polymer, the heterophase polymer has two different phases:
(i) homo polypropylene and
(ii) copolymers of ethylene and propylene,
which is manufactured in a two stages process, where polymerization of homo-polypropylene takes place in a first reactor and in a second reactor ethylene propylene rubber polymerization takes place. In a preferred feature, the polymerization is carried out in presence of a Ziegler Natta or metallocene catalyst. In yet another feature, ethylene content of the ethylene propylene copolymer is in the range from 10-80 wt %. In one feature, ethylene content in the heterophase polymer is in the range of 8-20%. In another preferred feature, xylene content of the heterophase polymer is in range of 10-30 wt % as per ASTM D5492, melt flow index (MFI) is in the range of 10-100 g/10 min as per ASTM D1238 and the flexural modulus is in range of 700-1300 MPA and impact properties defined by notched izod at room temperature measured is in the range of 80-700 J/m (NO break i.e., >500 J/m) as per ASTM standard D790 and D256 respectively.

The present invention also provides a morphology modified heterophase polymer having two different phase comprising:

first phase being propylene phase polymer comprising homo polypropylene and copolymer of propylene and ethylene, and optionally C4-C10 alpha olefin, wherein propylene content in the propylene phase polymer is 90-95% by weight, and second phase being ethylene phase polymer comprising homo polyethylene and co polymers of ethylene and C3-C10 alpha olefins, wherein ethylene content in the ethylene phase polymer is in the range of 20 to 50% by weight:

wherein the morphology modified heterophase polymer is having a No-Break impact strength in the range of 500 J/m-700 J/m as per ASTM standard D256, a high melt flow index in the range of 3 to 150 g/10 min as per ASTM D1238, and a balanced flexural modulus 700-1400 MPa as per ASTM standard D790, and wherein said morphology modified heterophase polymer is obtainable by premixing a multifunctional additive and a peroxide in an organic solvent to obtain a morphology modifier composition and mixing the morphology modifier composition with a heterophase polymer to obtain a premixed composition; and extruding the premixed composition to obtain the morphology modified heterophase polymer.

DETAILED DESCRIPTION OF THE INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

The present invention intends to provide a novel and economical process for morphology modification of heterophase polypropylene copolymer using a multifunction additive and organic peroxide where the morphology modification involves enhancement of interaction of rubber phase of impact copolymer of polypropylene with the homo-polymer matrix of impact copolymer polypropylene which results in enhancement of impact properties of post reactor modified resin to several multiple folds along with increase in melt flow properties of the post reactor modified resin in multiple folds.

The present invention is directed to morphology modification of heterophase copolymer of polypropylene which involves a novel and economical process of preparation of morphology modifier composition and post reactor extrusion process.

Polymer:

The heterophase polymer mentioned in the current invention has two different phase i.e., homo polypropylene and copolymers of ethylene and propylene which is manufactured in a two stage process, where polymerization of homo-polypropylene takes place in the first reactor and in second reactor ethylene propylene rubber polymerization takes place if required polymerization can take place in third rector as well. Catalyst used for this polymerization process can be Ziegler Natta or metallocene catalyst. The ethylene percent of ethylene propylene copolymer is in range from 10-80 wt %. The ethylene content in the final heterophase polymer is in the range of 8-20% and the Xylene content of the resulting polymer is in range of 10-25 wt % as per ASTM D5492. MFI range of heterogeneous polymer is from 3-12 g/10 min as per ASTM D1238. The flexural modulus of the heterophase polymer is in range of 700-130 MPA and impact properties defined by notched izod at room temperature measured is in range of 80-700 J/m as per ASTM standard D790 and D256 respectively. The heterophase polymer mentioned in current invention is used in ex reactor powder form or in granules form.

Process:

Process of the current invention involves two stages. Stage 1 includes preparation of morphology modifier composition and mixing of reactive modification additive/morphology modifier composition with heterophase polymer. Stage 2 involves reactive extrusion process where the final mixture obtained from stage 1 is extruded in a twin screw extruder in temperature range 150° C.-260° C.

Stage-1

Morphology Modifier Additive/Reactive Modifier Additive Mixture/Morphology Modifier Composition:

Premixing of Multifunctional Additive and peroxide in an organic solvent (e.g., Acetone, DCM, paraffin oil, ethanol) of range 0-100 ml/kg or preferably in range of 5-40 ml/kg, or more preferably in range 5-20 ml/kg is carried out preferably at temperature between 10 to 35° C. or should not exceed boiling point of the organic solvent or peroxide or Multifunctional Additive. Premixing is carried out for 2 minutes or longer, preferably 5 minutes or longer, more preferably 10 mins or longer and in particular 30 minutes to 45 minutes or longer. The premixing is carried out at ambient pressure, either in presence of inert gas or in presence of air.

The morphology modifier composition thus prepared is added to polyolefin's like heterophase polypropylene (Copolymer including random as well as block copolymers). The morphology modifier composition obtained by above method may be used in liquid form when adding to polyolefin's reactor powder or granules in batch mixer/high speed mixer or in liquid dosing system in twin screw extruder.

Premixing of reactor powder of impact copolymer PP powder with PETA (pentaerythritol triacrylate) & Peroxide solution along with Antioxidant, Acid scavenger and Nucleating agent additive package is done in high speed mixer at room temperature and at ambient pressure with an average residence time of 5 minutes to 30 minutes or longer, more preferably 2 minutes or longer.

Antioxidant (primary, secondary), Acid scavenger and Nucleating agent additive package are added along with Polypropylene reactor powder and reactive modifier additive mixer during mixing in high speed mixer at following ppm level (750, 750), 350p, 250 ppm respectively, Whereas Impact copolymer polypropylene granules contains this additive packages inherent which is added during extrusion stage of manufacturing process.

The primary and secondary antioxidants used in this experiment is combination of tetrakis methylene[3,5-di-tert-butyl-4-hydroxyhydroconnamate]methane (Irganox 1010) & tris(2,4-di-tert.-butylphenyl)phosphate (Irganox 168). The nucleating agent used in this is HPN 20E, acid scavenger used in these experiment is Calcium stearate.

Primary and secondary antioxidants are added in range of 250 ppm to 1%, preferably 250-5000 ppm and more preferably in range of 250-1500 ppm. Nucleating agent & acid scavenger is added in range of 250 ppm-2%, preferably 250-5000 ppm more preferably 250-1500 ppm.

Stage 2—Reactive Extrusion Process:

Premixed compound were then melt compounded in Twin screw extruder Labtech make of screw Diameter of 26 mm and Length/Diameter ratio 40:1 of and maximum screw rotating speed 800 rpm. Speed of the extruder is maintained at 100-200 rpm and barrel temperature range maintained at 100-250° C., feeding rate 8-20 Kg/hr. The extrudate of modified batches are pelletized after cooling in water bath to pellets of size 2-3 mm.

The compound obtained in accordance with the present invention may be used in particular form, preferably as pellets when adding to final compounding process. Compound thus obtained may be used as fine powder.

In one feature of the present invention the morphology modified heterophase polymer having an impact strength improved PP having No-Break impact strength and a very high melt flow index of 100 g/10 min(not limited to) having a balanced flexural modulus is developed by modifying a PP produced using conventional Ziegler Natta Catalyst and process where impact strength is limited to 100 J/m, MFi of 10 g/min and moderated Flexural modulus. The modification improves both melt flow index and impact strength simultaneously. The modification can be done on conventional extruder used in polymer industry with the addition of multi functional compounds in the presence of activators like peroxides and reaction stabilizers like diluents. The above said morphology modified heterophase polymer also is FDA and REACH regulation passed samples.

In another feature of the present invention, the heterophase polyolefin polymer consist of two different phase first being a propylene phase polymer made of homo and copolymer of propylene and ethylene and/or C4-C10 alpha olefins where ethylene concentration can be maximum upto 50%. The second phase being an ethylene phase polymer made of homo and co polymers of ethylene and C3-C10 alpha olefins.

The ethylene polymer phase may be only made of ethylene or copolymer of ethylene and C3-C10 alpha olefins based on which the ethylene content may vary from 8 to 90% by weight.

Here either ethylene or propylene phase constitutes the continuous and discrete phase of the heterogeneous polymer system. The concentration of ethylene and propylene phase may vary widely dependant on the discrete or dispersion phase concentration.

The propylene content of propylene phase polymer may be 80% or higher and ethylene content in the heterophase composition may be in range of 5 to 75% by weight. Similarly the ethylene polymer phase can be made of ethylene propylene copolymer or ethylene octane based elastomer.

The following non-limiting examples illustrate in details about the invention. However, they are, not intended to be limiting the scope of present invention in any way.

EXAMPLES

Polymer:

PP1A is a reactor powder/heterophase polymer of copolymer of propylene and ethylene having a MFR2 (230° C.) of 9-11 g/10 min, Ethylene content of 14-15%, Xylene soluble of 21-23 wt %, Flexural modulus of 800-1000 MPa, Notched izod Impact strength of >500 J/m.

PP1B is an extruded granule of copolymer of propylene and ethylene having a MFR2 (230° C.) of 9-11 g/10 min, Ethylene content of 14-15%, Xylene soluble of 21-23 wt %, Flexural modulus of 800-1000 MPa, Notched izod Impact strength of >500 J/m.

PP2A is a reactor powder of copolymer of propylene and ethylene having a MFR2 (230° C.) of 7-9 g/10 min, Ethylene content of 8.5-10.5%, Xylene soluble of 18-20 wt %, Flexural modulus of 1000 MPa-1200 MPa, Notched izod Impact strength of 100-200 J/m.

PP2B is an extruded granule of copolymer of propylene and ethylene having a MFR2 (230° C.) of 7-9 g/10 min, Ethylene content of 8.5-10.5%, Xylene soluble of 18-20 wt %, Flexural modulus of 1000 MPa-1200 MPa, Notched izod Impact strength of 100-200 J/m.

PP3A is a reactor powder of copolymer of propylene and ethylene having a MFR2 (230° C.) of 9-12 g/10 min, Ethylene content of 8-10%, Xylene soluble of 16.5-19.5 wt %, Flexural modulus of 1000 MPa-1200 Mpa, Notched izod Impact strength of 100-200 J/m.

PP3B is an extruded granule of copolymer of propylene and ethylene having a MFR2(230° C.) of 9-12 g/10 min, Ethylene content of 8-10%, Xylene soluble of 16.5-19.5 wt %, Flexural modulus of 1000 MPa-1200 MPa, Notched izod Impact strength of 100-200 J/m.

PP4 is a reactor powder of copolymer of propylene and ethylene having a MFR2(230° C.) of 3-4 g/10 min, Ethylene content of 9-10%, Xylene soluble of 15.5-18.5 wt %, Flexural modulus of 1000 MPa-1200 Mpa, Impact strength of >150 J/m.

Chemical Details:

The details of chemical used in the examples are as followings:

- Peroxide 1—Luperox 101 (2,5-dimethyl-2,5-di(tert-butylperoxy)hexane) Mw—290 g/mol, 0.877 g/ml and assay 90%.
- Peroxide 2—Triganox 301 (3,6,9-triethyl-3,6,9-trimethyl-1,4,7-triperoxonane)
- MFC1—PETA (Penta Erythritol Tri Acrylate) used has Mw of 298.29 g/mol, 1.18 g/ml @25° C. and contains 300-400 ppm monomethyl ether hydroquinone as inhibitor.
- MFC 2—PETeA (Penta Erythritol Tetra Acrylate)
- Solvent 1—Acetone used is of purity 990% and weight per ml at 20° C. is 0.79-0.792 g the maximum limits of impurities of non volatile matter is 0.002%, Acidity 0.015% & water 0.4%.
- Solvent 2—DCM (Dichloromethane)
- Solvent 3—LP(liquid paraffin light) used has viscosity at 25° C. 25-80 mPas, weight per ml at 25° C. 0.82-0.88 g, and max impurity of water is 0.05%

Experimental Details:

The pelletized compound of reactive extrusion process is used to prepare samples for mechanical testing as per ASTM standards by injection moudling machine of L&T plastics machinery of 40 mm screw diameter, L:D ratio 20:1 and 60 tonnage locking force. The barrel temperature was maintained at 150° C.-300° C. and mould temperature was maintained at 60° C. The resulted injection molded samples were used for tensile, flexural and impact strength measurements as per ASTM standards.

Melt flow rate of the compounded sample was determined according to ASTM D1238 at 230° C., 2.16 Kg load in Automatic multiload MFI machine of Gottfret make.

Flexural modulus was determined as per ASTM D790 in universal testing machine of TIRA Germany make after being conditioned as per ASTM D618 standard.

Notched Izod Impact strength of bars which measured as per ASTM D256 was measured at 23° C. after being conditioned as per ASTM D618 standard.

Yellowness Index is a number calculated from spectrophotometric data that describes the change in color of a test sample from clear or white to yellow. This test is most commonly used to evaluate color changes in a material caused by real or simulated outdoor exposure. Yellowness index of extruded granules was determined as per ASTM E 313-10 was measured at 23° C. in—Labscan XE of Hunterlab.

Example 1

The following example illustrates the reactive modification of Impact copolymer polypropylene reactor powder (PP3A) using various reactive morphology modifier composition and properties enhanced according to method of present invention.

TABLE 1 shows the various mixtures used for reactive extrusion in PP3.

| S. NO | Peroxide1 ppm | MFC1 ppm | MFC2 ppm | Solvent 1 ml/kg |
|---|---|---|---|---|
| EXP1 | NIL | NIL | NIL | 45 |
| EXP2 | 25 | 5000 | — | 45 |
| EXP3 | 50 | 5000 | — | 45 |
| EXP4 | 25 | 5000 | — | 45 |
| EXP5 | 50 | 5000 | — | 45 |
| EXP6 | 25 | 7500 | — | 45 |
| EXP7 | 50 | 7500 | — | 45 |
| EXP8 | 25 | — | 2500 | 45 |
| EXP9 | 50 | — | 2500 | 45 |
| EXP10 | 100 | — | 2500 | 45 |
| EXP11 | 25 | — | 5000 | 45 |
| EXP12 | 50 | — | 5000 | 45 |
| EXP13 | 100 | — | 5000 | 45 |
| EXP14 | 25 | — | 7500 | 45 |
| EXP15 | 50 | — | 7500 | 45 |
| EXP16 | 100 | — | 7500 | 45 |
| EXP17 | — | — | — | 45 |
| EXP18 | 100 | — | — | 45 |
| EXP19 | 150 | — | — | 45 |
| EXP20 | 100 | 1000 | — | 45 |
| EXP21 | 100 | 1500 | — | 45 |
| EXP22 | 100 | 2000 | — | 45 |
| EXP23 | 100 | 2500 | — | 45 |
| EXP24 | 150 | 1500 | — | 45 |
| EXP25 | 150 | 2500 | — | 45 |
| EXP26 | 175 | 2500 | — | 45 |
| EXP27 | 180 | 1500 | — | 45 |
| EXP28 | 200 | 2500 | — | 45 |
| EXP29 | 200 | 5000 | — | 45 |
| EXP36 | 500 | 7500 | — | 45 |
| EXP37 | 600 | 15000 | — | 45 |

The test samples of all the above mentioned formulations were prepared and physical properties of the samples were tested according to ASTM Standards as mentioned above. Examples 1 and 17, both are neat Polypropylene material from plant but from different production lot.

Table below illustrates the Melt Flow index at 230° C., 2.16 Kg load (g/10 mins), Impact strength in J/m as per ASTM D256 and Flexural modulus in MPa as per ASTM D 790 of modified batches in polypropylene PP3A.

| S. NO | MFI @230° C. g/10 min | Flexural Modulus (N/mm$^2$) | Impact Strength J/m |
|---|---|---|---|
| EXP1 | 11.4 | 1207 | 115 |
| EXP2 | 8.7 | 1163 | 513 |
| EXP3 | 11.2 | 1128 | 508 |
| EXP4 | 6 | 995 | 522 |
| EXP5 | 11.4 | 947 | 523 |
| EXP6 | 8.3 | 1068 | 536 |
| EXP7 | 10.4 | 1050 | 522 |
| EXP8 | 9.7 | 967 | 531 |
| EXP9 | 12.9 | 973 | 511 |
| EXP10 | 15.8 | 1007 | 519 |
| EXP11 | 8.7 | 1035 | 558 |
| EXP12 | 10.9 | 1037 | 516 |
| EXP13 | 13.2 | 1012 | 510 |
| EXP14 | 7.5 | 1060 | 536 |
| EXP15 | 9.5 | 1018 | 518 |
| EXP16 | 11 | 971 | 527 |
| EXP17 | 11.4 | 892 | 194 |
| EXP18 | 20 | 878 | 91 |
| EXP19 | 22.9 | 888 | 96 |
| EXP20 | 16.4 | 839 | 538 |
| EXP21 | 16 | 875 | 540 |
| EXP22 | 14.6 | 891 | 537 |
| EXP23 | 15.3 | 922 | 530 |
| EXP24 | 18.4 | 813 | 519 |
| EXP25 | 17.4 | 902 | 515 |
| EXP26 | 20 | 833 | 514 |
| EXP27 | 15.9 | 1065 | 517 |
| EXP28 | 22.3 | 869 | 517 |
| EXP29 | 19.4 | 927 | 482 |
| EXP36 | 31 | — | 176 |
| EXP37 | 29.3 | — | 216 |

PP3A reactor powder of MFI 11 g/10 min and impact strength around 115 J/m (EXP 1) is used for above experiments. EXP 1 is a comparative example where no peroxide and MFC is added and processed in TSE in similar process condition mentioned in reactive extrusion process.

Exp 2-16 with lower peroxide concentration i.e., 25-100 ppm in combination with MFC of higher concentration range 2500-7500 ppm yielded higher Impact strength>500 J/m but maintained MFI in range of 8-15 g/10 min, i.e., flow properties are not altered.

But in EXP20-29 peroxide concentration in range of 100-200 ppm in combination with MFC's of range 1000-5000 ppm yielded higher MFI of range 16-22 and impact strength is >500 J/m maintaining flexural modulus in range of 800-1060 MPa.

Example 2

The following example illustrates the reactive modification of Impact copolymer polypropylene extruded granules (PP3B) using various reactive morphology modifier composition and properties enhanced according to method of present invention.

| S. NO | Peroxide 1 ppm | MFC1 ppm | MFC2 ppm | Solvent 1 ml/kg | Solvent 3 ml/kg |
|---|---|---|---|---|---|
| EXP38 | — | — | — | 45 | — |
| EXP39 | 50 | 5000 | — | 45 | — |
| EXP40 | 200 | 7500 | — | 45 | — |
| EXP41 | 200 | 7500 | — | 45 | — |
| EXP76 | 250 | 3000 | — | — | 15 |
| EXP77 | 200 | 2000 | — | — | 15 |
| EXP78 | 250 | 2500 | — | — | 15 |

The test samples of all the above mentioned formulations were prepared and physical properties of the samples were tested according to ASTM Standards as mentioned above.

Table below illustrates the Melt Flow index at 230° C., 2.16 Kg load (g/10 mins), Impact strength in J/m as per ASTM D256 and Flexural modulus in MPa as per ASTM D 790 of modified batches in polypropylene PP3B.

| S. NO | MFI @230° C. g/10 min | Flexural Modulus (N/mm²) | Impact Strength J/m |
|---|---|---|---|
| EXP38 | 11.0 | 1200 | 98 |
| EXP39 | 6.7 | — | 479 |
| EXP40 | 15.2 | — | 543 |
| EXP41 | 15.6 | — | 557 |
| EXP76 | 20 | 840 | 608 |
| EXP77 | 19 | 840 | 630 |
| EXP78 | 20 | 837 | 617 |

PP3B extruded granule material of MFI 11 g/10 min and impact strength 100 J/m (EXP 38). EXP 38 is a comparative example where no peroxide and MFC is added and processed in TSE in similar process condition mentioned in reactive extrusion process.

Morphology modification is carried out in PP3B (used in EXP 38) with addition of peroxide of range 100-200 ppm and MFC of range 2500-7500 ppm (See EXP 40-41, 76-78.) resulted in MFI of range 18-20 g/10 min and impact strength>500 J/m, i.e., No break.

However in EXP 39 with lower peroxide (i.e., 50 ppm) and MFC of concentration 5000 ppm it yielded no break (i.e., impact strength>500 J/m) & resulted in drop of MFI (i.e., 6.7 g/10 min).

Example 3

The following example illustrates the reactive modification of Impact copolymer polypropylene reactor powder (PP2A) using various reactive morphology modifier composition and properties enhanced according to method of present invention.

| S. NO | Peroxide 1 ppm | Peroxide 2 ppm | MFC 1 ppm | Solvent 1 ml/kg |
|---|---|---|---|---|
| EXP 42 | — | — | — | — |
| EXP 43 | 200 | — | — | 45 |
| EXP 44 | — | 250 | — | 45 |
| EXP 45 | 200 | — | — | 60 |
| EXP 46 | — | 250 | — | 60 |
| EXP 47 | 250 | — | 2500 | 60 |
| EXP 48 | 275 | — | 2500 | 60 |
| EXP 49 | 300 | — | 2500 | 60 |
| EXP 50 | 350 | — | 2500 | 60 |
| EXP 51 | 300 | — | 2500 | 60 |
| EXP 52 | 450 | — | 0 | 60 |
| EXP 53 | 700 | — | 5000 | 60 |

The test samples of all the above mentioned formulations were prepared and physical properties of the samples were tested according to ASTM Standards as mentioned above. EXP 42 is virgin polypropylene material. That is no additives added. Extruded in TSE and kept as reference.—i.e., it is PP2A material.

Table below illustrates the Melt Flow index at 230° C., 2.16 Kg load (g/10 mins), Impact strength in J/m as per ASTM D256 and Flexural modulus in MPa as per ASTM D 790 of modified batches in polypropylene PP2A.

| S. NO | MFI @230° C. g/10 min | Flexural Modulus (N/mm2) | Impact Strength J/m |
|---|---|---|---|
| EXP 42 | 7.5 | 1187 | 381 |
| EXP 43 | 17.5 | 1095 | 165 |
| EXP 44 | 17.9 | — | 174 |
| EXP 45 | 17.0 | 1067 | 172 |
| EXP 46 | 18.5 | — | 168 |
| EXP 47 | 16.7 | 1061 | 529 |
| EXP 48 | 16.6 | — | 637 |
| EXP 49 | 18.7 | 889 | 628 |
| EXP 50 | 21.4 | 849 | 606 |
| EXP 51 | 16.8 | 882 | 644 |
| EXP 52 | 29.6 | — | — |
| EXP 53 | 33.6 | — | — |

PP2A reactor powder (EXP 42) of MFI 8 g/10 min and impact strength of 300 J/m. EXP 42 is a comparative example where no peroxide and MFC is added and processed in TSE in similar process condition mentioned in reactive extrusion process.

PP2A reactor powder (used in EXP 42) of MFI 8 g/10 min and impact strength of 300 J/m resulted in MFI of range 15-22 MFI when morphology modified using peroxide of range 200-500 ppm in combination with MFC's of lower concentration 2500 ppm (EXP 43-51).

Example 4

The following example illustrates the reactive modification of Impact copolymer polypropylene granule (PP2B) using various reactive morphology modifier composition and properties enhanced according to method of present invention.

| S. No | Peroxide 1 Ppm | MFC 1 Ppm | Solvent 1 ml/kg | Solvent 2 ml/kg | Solvent 3 ml/kg |
|---|---|---|---|---|---|
| EXP 54 | — | — | — | — | — |
| EXP 55 | 300 | 2500 | 0 | 60 | — |
| EXP56 | 300 | 3000 | 0 | 60 | — |
| EXP79 | 300 | 3000 | 30 | — | — |
| EXP80 | 300 | 3000 | — | — | 15 |
| EXP81 | 250 | 2500 | — | — | 15 |
| EXP82 | 500 | 3000 | — | — | 15 |
| EXP83 | 800 | 2500 | — | — | 15 |
| EXP84 | 1500 | 2000 | — | — | 15 |

The test samples of all the above mentioned formulations were prepared and physical properties of the samples were tested according to ASTM Standards as mentioned above.

Table below illustrates the Melt Flow index at 230° C., 2.16 Kg load (g/10 mins), Impact strength in J/m as per ASTM D256 and Flexural modulus in MPa as per ASTM D 790 of modified batches in polypropylene PP2B.

| S. NO | MFI @230° C. g/10 min | Flexural Modulus (N/mm2) | Impact Strength J/m |
|---|---|---|---|
| EXP 54 | 9 | 1110 | 150 |
| EXP 55 | 22.5 | 910 | 581 |
| EXP56 | 21.2 | 820 | 475 |
| EXP79 | 18.8 | 962 | 627 |
| EXP80 | 23.2 | 804 | 642 |
| EXP81 | 18.5 | 863 | 573 |
| EXP82 | 27 | 751 | 640 |
| EXP83 | 39 | 778 | 643 |
| EXP84 | 61 | 630 | 583 |

PP2B granules of properties MFI 9 g/10 min and impact strength of 150 J/m (EXP 54) is used for above experiments. EXP 54 is a comparative example where no peroxide and MFC is added and processed in TSE in similar process condition mentioned in reactive extrusion process.

EXP (55-56, 79-81) performed with peroxide in range of 250-300 ppm and MFC in range of 2500-3000 ppm resulted in extruded granules with MFI of range 18-22 g/10 min & impact strength>500 J/m i.e., No break.

EXP (82-84) performed with peroxide in range of 500-1500 ppm and MFC in range of 2000-3000 ppm resulted in extruded granules with MFI of range 27-60 g/10 min & impact strength>500 J/m i.e., No break.

Example 5

The following example illustrates the reactive modification of Impact copolymer polypropylene reactor powder (PP1A) using various reactive morphology modifier composition and properties enhanced according to method of present invention.

| S. No. | Peroxide 1 Ppm | MFC 1 Ppm | Solvent 1 ml/kg | Solvent 2 ml/kg |
|---|---|---|---|---|
| EXP 57 | — | — | — | — |
| EXP58 | 1000 | 7500 | 45 | — |
| EXP 59 | 1200 | 9000 | 45 | — |
| EXP 60 | 750 | — | 45 | — |
| EXP 61 | 1000 | — | 45 | — |
| EXP 62 | 1600 | 12000 | 45 | — |
| EXP 63 | 1600 | 15000 | 45 | — |
| EXP 64 | 1600 | 20000 | 45 | — |
| EXP 65 | 350 | 2500 | 60 | — |
| EXP 66 | 350 | 2500 | — | 60 |

The test samples of all the above mentioned formulations were prepared and physical properties of the samples were tested according to ASTM Standards as mentioned above.

Table below illustrates the Melt Flow index at 230° C., 2.16 Kg load (g/10 mins), Impact strength in J/m as per ASTM D256 and Flexural modulus in MPa as per ASTM D 790 of modified batches in polypropylene PP1A.

| S. NO | MFI @230° C. g/10 min | Flexural Modulus (N/mm2) | Impact Strength J/m |
|---|---|---|---|
| EXP 57 | 11.5 | — | 630 |
| EXP58 | 47.6 | — | 139 |
| EXP 59 | 53.7 | — | — |
| EXP 60 | 50.3 | — | — |
| EXP 61 | 69.3 | — | 110 |
| EXP 62 | 75.7 | — | 140 |
| EXP 63 | 67.8 | — | 120 |
| EXP 64 | 64 | — | 108 |
| EXP 65 | 26.2 | 832 | 558 |
| EXP 66 | 29.0 | 723 | 602 |

PP1A material (EXP57) has MFI 11.5 g/10 min & impact strength 630 J/m (No break) grade. EXP 57 is a comparative example where no peroxide and MFC is added and processed in TSE in similar process condition mentioned in reactive extrusion process.

EXP 65 & 66 were performed in PP1A material with peroxide of concentration 350 ppm and MFC of concentration 2500 ppm and resulted in MFI of 25-30 g/10 min & no break.

In EXP (59-64) resulted in higher MFI but yield lower impact strength in a range of 100-150 J/m.

Example 6

The following example illustrates the reactive modification of Impact copolymer polypropylene extruded granules (PP1B) using various reactive morphology modifier composition and properties enhanced according to method of present invention.

| S. No | Peroxide 1 ppm | MFC 1 ppm | Solvent 1 ml/kg | Solvent 2 ml/kg | Solvent 3 |
|---|---|---|---|---|---|
| EXP 67 | 350 | 2500 | — | 60 | — |
| EXP 68 | 350 | 2500 | 60 | — | — |
| EXP 69 | 300 | 2500 | — | 60 | — |
| EXP 70 | 400 | 3000 | — | 60 | — |
| EXP 71 | 450 | 3000 | — | 60 | — |
| EXP 72 | 450 | 2000 | — | 60 | — |
| EXP 73 | 500 | 2500 | — | 60 | — |
| EXP 74 | 700 | 2000 | — | 60 | — |
| EXP 75 | 800 | 2000 | — | 60 | — |
| EXP85 | 500 | 2500 | — | — | 15 |
| EXP86 | 800 | 2000 | — | — | 15 |
| EXP87 | 500 | 3000 | — | — | 10 |
| EXP88 | 500 | 3000 | — | — | 5 |
| EXP89 | 500 | 3000 | — | — | 0 |
| EXP90 | 500 | 2500 | — | — | 5 |
| EXP91 | 500 | 2500 | — | — | 10 |
| EXP92 | 500 | 2500 | — | — | 15 |
| EXP93 | 1500 | 1000 | — | — | 15 |
| EXP94 | 2000 | 1000 | — | — | 15 |
| EXP95 | 1500 | 800 | — | — | 15 |
| EXP96 | 2000 | 1250 | — | — | 15 |
| EXP97 | 2000 | 1500 | — | — | 15 |

The test samples of all the above mentioned formulations were prepared and physical properties of the samples were tested according to ASTM Standards as mentioned above.

Table below illustrates the Melt Flow index at 230° C., 2.16 Kg load (g/10 mins), Impact strength in J/m as per ASTM D256 and Flexural modulus in MPa as per ASTM D 790 of modified batches in polypropylene PP1B.

| S. No | MFI @230° C. g/10 min | Flexural Modulus (N/mm$^2$) | Impact Strength J/m | Yellowness Index |
|---|---|---|---|---|
| EXP 67 | 23.3 | 808 | 615 | — |
| EXP 68 | 27.4 | 770 | 632 | — |
| EXP 69 | 22.5 | 768 | 631 | — |
| EXP 70 | 25 | 771 | 582 | — |
| EXP 71 | 27.7 | 795 | 533 | — |
| EXP 72 | 27.4 | 971 | 568 | — |
| EXP 73 | 29.8 | 849 | 617 | — |
| EXP 74 | 31.1 | 802 | 587 | <2 |
| EXP 75 | 41.25 | 808 | 589 | <2 |
| EXP85 | 30 | 633 | 563 | — |
| EXP86 | 43 | 617 | 583 | — |
| EXP87 | 28 | 622 | 693 | — |
| EXP88 | 30 | 678 | 601 | — |
| EXP89 | 26 | 709 | 604 | — |
| EXP90 | 23 | 667 | 673 | — |
| EXP91 | 26 | 629 | 652 | — |
| EXP92 | 28 | 598 | 642 | — |
| EXP93 | 68 | 600 | 648 | — |
| EXP94 | 62 | 583 | 659 | — |
| EXP95 | 67 | 620 | 671 | — |
| EXP96 | 100 | 606 | 597 | — |
| EXP97 | 102 | 598 | 623 | — |

EXP 90-92 was performed to understand effect of solvent quantity in final properties such as MFI & Impact strength. In these three examples (EXP 90-92) peroxide and MFC where used at 500 & 2500 ppm respectively. Solvents were used in range of 5, 10, 15 ml/kg (EXP 90, 91, 92 respectively). It is observed that with increase in solvent quantity the MFI is increasing and effect on impact properties is marginal. This depicts the premixed compound mixing properties enhances with increase in solvent quantity. EXP 87-89 was also performed to understand effect of solvent on final properties. The correlation exist same in this experiments where peroxide and MFC used at 500, 3000 ppm respectively. In this also it was observed that with increase in solvent quantity the MFI is increasing and effect on impact properties is marginal.

EXP 93-97 were performed with higher concentration of peroxide (1500-2000) ppm and MFC's of concentration 800-1500 ppm it resulted in very high flow material of 100 g/10 min & impact strength>500 J/m, i.e. no break.

EXP 67-75, 85-86 were performed with peroxide concentration of 350-800 ppm and MFC's of range 2000-2500 ppm.

Advantages of the Present Invention

The following are the technical advantages of the present invention over the prior art as disclosed above:
- Achieving high impact and high flow from existing Impact copolymer polypropylene (ICP) produced with conventional technology.
- Melt Flow Index (MFI) and impact strength can be increased simultaneously without much affecting the flexural modulus.
- Economically viable alternate solution to produce Thermoplastic olefins (TPO) from PP produced by conventional process.

The invention claimed is:

1. A process for preparing a morphology modified heterophase polymer, the process comprising:
   (i) mixing a multifunctional additive and a peroxide, and adding an organic solvent to obtain a morphology modifier composition and mixing the morphology modifier composition with a heterophase polymer to obtain a a final mixture, wherein the organic solvent is added in an amount of 0.5 to 60 ml per kg of morphology modified heterophase polymer; and
   (ii) extruding the final mixture to obtain the morphology modified heterophase polymer.

2. The process as claimed in claim 1, wherein the final mixture is extruded in a twin screw extruder at a temperature in a range of 160-300° C.

3. The process as claimed in claim 1, wherein the multifunctional additive is an unsaturated organic vinyl compound and selected from the group consisting of pentaerythritol triacrylate, pentaerythritol tetraacrylate, and butanediol diacrylate.

4. The process as claimed in claim 1, wherein the multifunctional additive is added in an amount of 1000 to 7500 ppm of the morphology modified heterophase polymer.

5. The process as claimed in claim 1, wherein the peroxide is selected from the group consisting of an alkyl peroxide and a peroxy ester.

6. The process as claimed in claim 1, wherein the peroxide is added in an amount of 25 to 2000 ppm of the morphology modified heterophase polymer.

7. The process as claimed in claim 1, wherein the organic solvent is selected from the group consisting of acetone, dichloromethane (DCM), paraffin oil, and ethanol.

8. The process as claimed in claim 1, wherein the mixing the multifunctional additive and the peroxide is carried out at a temperature in a range of 10 to 35° C. or at a temperature below a boiling point of the organic solvent, peroxide, or multifunctional additive.

9. The process as claimed in claim 1, wherein the mixing the multifunctional additive and the peroxide is carried out for a time in a range of 2 minutes to 30 minutes.

10. The process as claimed in claim 1, wherein the step (i) further comprises adding an antioxidant, an acid scavenger, and a nucleating agent additive package.

11. The process as claimed in claim 1, wherein the heterophase polymer has two different phases:
   a first phase that is a propylene phase polymer; and a second phase that is an ethylene phase polymer;
   wherein the propylene phase polymer comprises homo polypropylene, a copolymer of propylene and ethylene, and optionally C4-C10 alpha olefin, wherein propylene content in the propylene phase polymer is 90-95% by weight, and,
   wherein the ethylene phase polymer comprises homo polyethylene and co-polymers of ethylene and C3-C10 alpha olefins, wherein ethylene content in the ethylene phase polymer is in a range of 20 to 50% by weight.

* * * * *